R. TOPHAM.
COMBINED SHOE HORN AND BUTTON HOOK.
APPLICATION FILED SEPT. 5, 1914.

1,150,403. Patented Aug. 17, 1915.

Witnesses
H. S. Morris.
V. J. Houghton.

Inventor
Richard Topham
By Grant Burroughs
Attorney

COLUMBIA PLANOGRAPH CO., WASHINGTON, D. C.

UNITED STATES PATENT OFFICE.

RICHARD TOPHAM, OF WASHINGTON, DISTRICT OF COLUMBIA.

COMBINED SHOE-HORN AND BUTTON-HOOK.

1,150,403. Specification of Letters Patent. Patented Aug. 17, 1915.

Application filed September 5, 1914. Serial No. 860,380.

*To all whom it may concern:*

Be it known that I, RICHARD TOPHAM, a citizen of the United States, and resident of Washington, in the District of Columbia, have invented certain new and useful Improvements in Combined Shoe-Horns and Button-Hooks, of which the following is a specification.

The invention relates to improvements in a combined shoe-horn and button-hook in which the horn and hook are so hinged that they can be readily folded together to be conveniently carried in the pocket, so that when one member is being employed to perform its function the other member will form a handle to the implement.

It has for its principal object the provision of means whereby the hook can be firmly held in an extended position on the horn while the hook is being employed in its purpose.

The invention consists in the novel construction, combination and arrangement of parts hereinafter described, pointed out in the appended claims and illustrated in the accompanying drawings.

Figure 1:
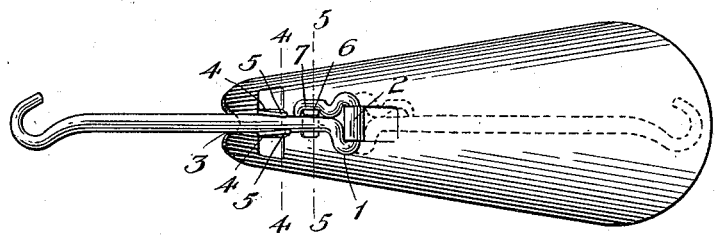
Figure 2:
Figure 3:
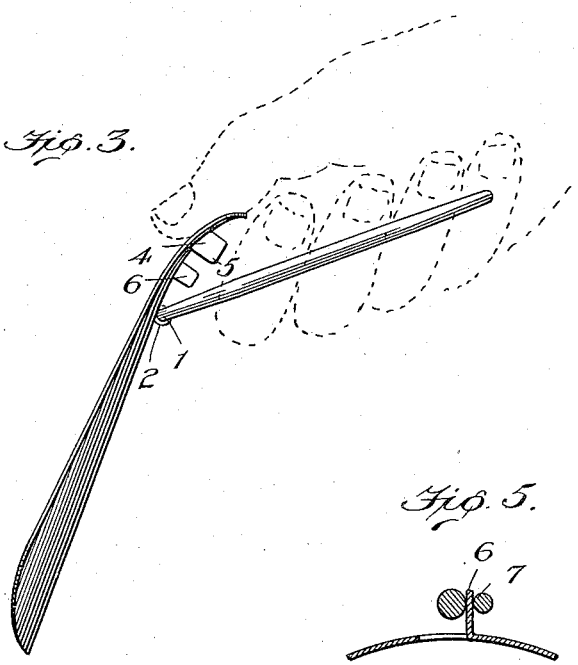
Figure 4:
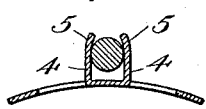
Figure 5:
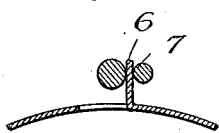

In the drawings, in which similar reference characters designate corresponding parts, Figure 1 is a plan view of an implement embodying the invention, the hook being shown in an extended position. Fig. 2 is a side elevation of the same. Fig. 3 is a side elevation, showing the hook opened to form a handle while the horn is being used. Fig. 4 is a cross-section on the line 4—4 of Fig. 1. Fig. 5 is a cross-section on the line 5—5 of Fig. 1.

The main parts of the horn and hook are of the usual construction. At the shank end of the hook is the flat loop 1 forming a pintle journaled in the socket 2 on the back of the horn a short distance from the upper end of the horn. By means of this hinge connection the two members can be folded together, as shown by dotted lines in Fig. 1, so that the implement can be carried conveniently in the pocket. Also, by this hinge connection the hook can be turned to an extended position to perform its function, as shown by full lines in Fig. 1. While the hook is being used the horn forms the handle for the implement.

While the hook is being used considerable force is exerted upon the implement and means are provided for rigidly holding the hook in its extended position on the horn. In the upper end of the horn is the notch 3 with which the hook registers in its extended position against the back of the horn. While this engagement of the hook in the notch tends to hold the hook against lateral movement, yet it is not sufficient to entirely hold it against the strain of the buttoning operation. Projecting from the back of the horn, adjacent to the notch 3, are the clips 4 between which the shank of the hook is engaged to be further held against lateral displacement. The corners of the clips, as at 5, are turned inwardly slightly over the shank of the hook and serve to hold the hook down between the clips and in the notch 3. As the clips are resilient they can spring apart as the hook is forced down between the corners 5. To more firmly hold the hook against lateral displacement during a buttoning operation, a lug 6 projects from the back of the horn between the clips 4 and the hinge connection. This lug 6 registers with the socket 7 in the shank of the hook. The hook in engagement with the notch 3, the clips 4, and the lug 6 is firmly held against lateral displacement during the buttoning operation, and is held against the back of the horn by the corners 5 of the clips.

When the implement is used as a shoe-horn, the hook is turned outwardly, and is used as a handle as shown in Fig. 3.

When not in use, the hook can be turned back against the horn, as shown by dotted lines in Fig. 1, and the implement can be conveniently carried in the pocket.

Having thus described my invention, what I claim and desire to secure by Letters Patent is:

1. In a combined shoe-horn and button-hook, a horn having a notch in its upper end, a hook hinged to the back of the horn and adapted to engage said notch, and clips on said horn to engage the hook to hold the same against lateral displacement.

2. In a combined shoe-horn and button-hook, a horn having a notch in its upper end, a hook hinged to the back of the horn and adapted to engage said notch, and clips on said horn to engage the hook to hold the same against lateral displacement, and said clips having their outer corners bent inwardly to project over the shank of the hook to hold the latter between the clips and in the notch.

3. In a combined shoe-horn and button-hook, a horn, a hook hinged to the back of the horn having a socket in its shank, and a lug on the back of the horn to engage said socket when the hook is turned to an extended position.

In testimony whereof I hereunto affix my signature in the presence of two witnesses.

RICHARD TOPHAM.

Witnesses:
 JOHN F. BECKER,
 GRANT BURROUGHS.

Copies of this patent may be obtained for five cents each, by addressing the "Commissioner of Patents, Washington, D. C."